(12) United States Patent
Asokan et al.

(10) Patent No.: US 10,769,170 B2
(45) Date of Patent: Sep. 8, 2020

(54) MULTI-FACETED VISUALIZATION

(71) Applicant: Oracle International Corporation, Redwood Shores, CA (US)

(72) Inventors: Saju Asokan, Thiruvananthapuram (IN); Vineeth Gopalakrishnan Nair, Ernakulam (IN); Neenu Jacob, Ernakulam (IN); Jothish Jenardhanan, Kollam (IN)

(73) Assignee: Oracle International Corporation, Redwood Shores, CA (US)

( * ) Notice: Subject to any disclaimer, the term of this patent is extended or adjusted under 35 U.S.C. 154(b) by 318 days.

(21) Appl. No.: 15/831,590

(22) Filed: Dec. 5, 2017

(65) Prior Publication Data
US 2019/0171757 A1  Jun. 6, 2019

(51) Int. Cl.
| | |
|---|---|
| *G06F 16/26* | (2019.01) |
| *G06F 3/048* | (2013.01) |
| *G06F 16/248* | (2019.01) |
| *G06F 3/0481* | (2013.01) |
| *G06T 15/00* | (2011.01) |
| *G06F 16/332* | (2019.01) |
| *G06F 16/93* | (2019.01) |
| *G06F 16/838* | (2019.01) |
| *G06F 16/901* | (2019.01) |

(52) U.S. Cl.
CPC ............ *G06F 16/26* (2019.01); *G06F 3/048* (2013.01); *G06F 16/248* (2019.01); *G06F 16/3328* (2019.01); *G06F 16/838* (2019.01); *G06F 16/9024* (2019.01); *G06F 16/93* (2019.01); *G06T 15/005* (2013.01); *G06F 3/04815* (2013.01); *G06F 2203/04802* (2013.01)

(58) Field of Classification Search
CPC ......... G06F 3/048; G06F 16/248; G06F 16/26
See application file for complete search history.

(56) References Cited

U.S. PATENT DOCUMENTS 5,678,015 A * 10/1997 Goh .................... G06F 3/04815
                                                        345/419
7,672,951 B1    3/2010 Bierner
(Continued)

OTHER PUBLICATIONS

Stefan Buchta "Oracle Secure Enterprise Search 11g R2", An Oracle Technical White Paper, Jul. 2013, Release 11.2.2.2.

*Primary Examiner* — William Spieler
(74) *Attorney, Agent, or Firm* — Potomac Law Group, PLLC

(57) ABSTRACT

System and methods are provided for displaying dynamic content on a graphical user interface. A first data illustration of a first facet of data is displayed in a first two-dimensional interface, wherein the first two-dimensional interface corresponds to a side or cross-section of a three-dimensional interface, and the first two-dimensional interface displays a plurality of filters for the first data illustration. A selection for one of the plurality of filters and a selection to display a second facet of data are received from a user. A dynamic rotation of the three-dimensional interface to a second side or cross-section that corresponds to a second two-dimensional interface is displayed, wherein a second data illustration of the second facet of data is displayed in the second interface, the second data illustration being filtered according to the selected filter.

20 Claims, 15 Drawing Sheets

(56) References Cited

U.S. PATENT DOCUMENTS

| | | | | |
|---|---|---|---|---|
| 2003/0090524 A1* | 5/2003 | Segerberg | .......... | H04N 5/44543 715/786 |
| 2007/0233654 A1* | 10/2007 | Karlson | ................. | G06F 16/40 |
| 2010/0309228 A1* | 12/2010 | Mattos | ................. | G06F 1/1626 345/654 |
| 2011/0187724 A1* | 8/2011 | Oh | ...................... | G06F 3/04815 345/473 |
| 2012/0109986 A1* | 5/2012 | Palermiti, II | ....... | G06F 16/3328 707/754 |
| 2013/0326426 A1* | 12/2013 | Queric | ................ | G06F 3/04815 715/851 |
| 2014/0043263 A1* | 2/2014 | Park | ...................... | G06F 3/0418 345/173 |

\* cited by examiner

MULTI-FACETED VISUALIZATION

FIELD

The embodiments of the present disclosure generally relate to a graphical user interface that displays a multi-faceted visualization.

BACKGROUND

Data growth has exploded over time and, as a result, big data management has become increasingly important to the technology groups of organizations. Managing data growth involves a dynamic approach, such as addressing the increasingly complex challenges of data storage and retrieval, and providing advancements in the display of data and data analytics to relevant users. As a result of innovation in interface technology, modern day users are provided a wealth of information at the click of a button or tap of a screen.

However, information overload can be just as ineffective as a lack of information. In addition, the ability to manipulate an interface, for instance to view different metrics related to a particular data set, can be advantageous to a user. Static or otherwise cumbersome interfaces can lead to inefficient use of display real estate, and thus poor data comprehension by the user. Accordingly, an interface that efficiently displays relevant data from a data set while concurrently providing functionality to dynamically manipulate the data displayed would be beneficial to users of the interface.

SUMMARY

The embodiments of the present disclosure are generally directed to systems and methods for providing a geometric graphical user interface for displaying dynamic content that substantially improve upon the related art.

Features and advantages of the embodiments are set forth in the description which follows, or will be apparent from the description, or may be learned by practice of the disclosure.

System and methods are provided for displaying dynamic content on a graphical user interface. A first data illustration of a first facet of data is displayed in a first two-dimensional interface, wherein the first two-dimensional interface corresponds to a side or cross-section of a three-dimensional interface, and the first two-dimensional interface displays a plurality of filters for the first data illustration. A selection for one of the plurality of filters and a selection to display a second facet of data are received from a user. A dynamic rotation of the three-dimensional interface to a second side or cross-section that corresponds to a second two-dimensional interface is displayed, wherein a second data illustration of the second facet of data is displayed in the second interface, the second data illustration being filtered according to the selected filter.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

Figure 1:
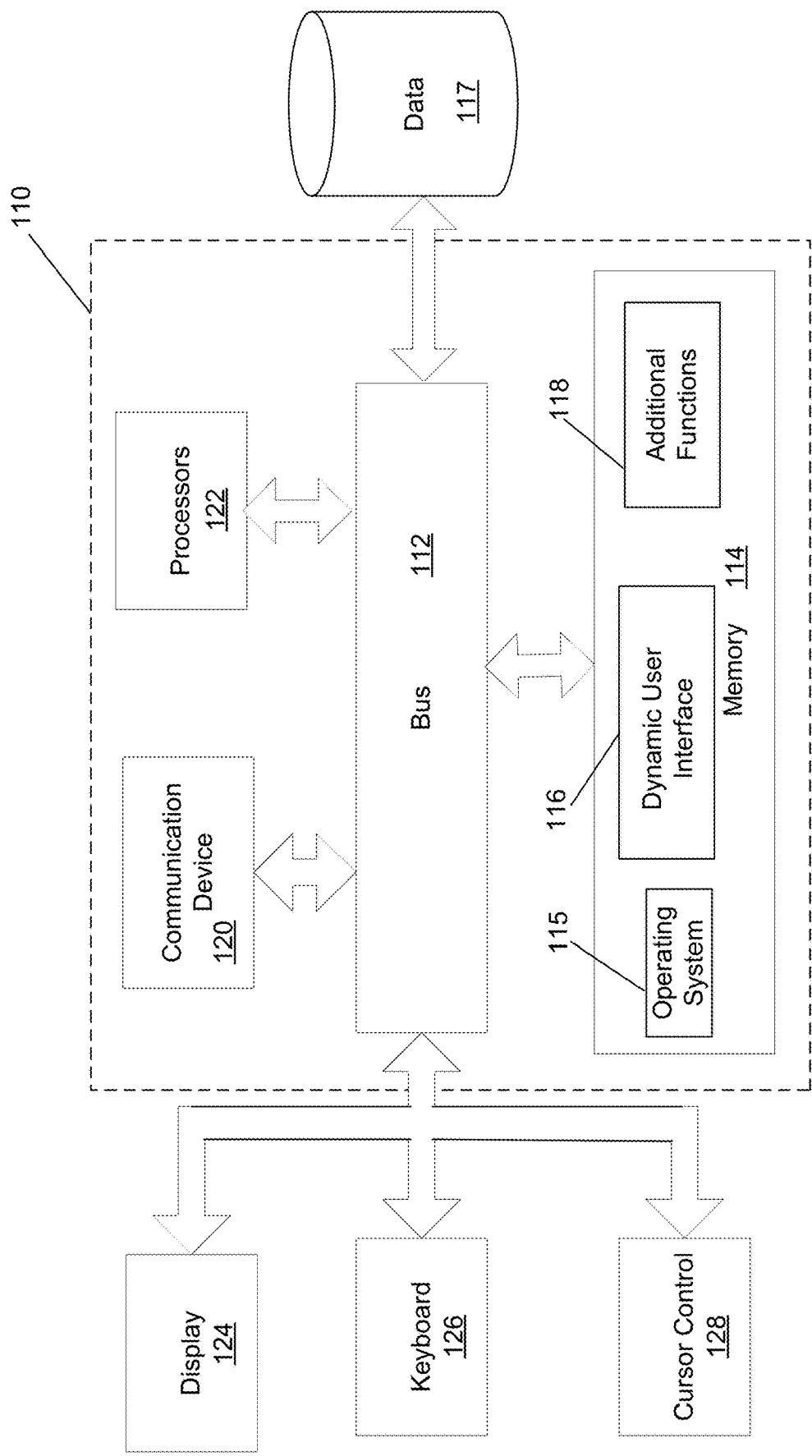
FIG. 1 illustrates a block diagram of a computing device operatively coupled to a system for displaying dynamic content on a graphical user interface according to an example embodiment.

Embodiments provide a graphical user interface for displaying dynamic content. For example, a graphical user interface can include a three-dimensional interface that can be rotated to display different facets of data. The three-dimensional interface can include sides or cross-sections that are two-dimensional interfaces, where each side or cross-section includes a data illustration depicting a different facet of data. Filtration or dill-down functionality can also be implemented, where filtration or drill-down on one side or cross-section of the three-dimensional interface also filters other sides or cross-sections. Example three-dimensional interfaces include cubes, prisms, rectangular prisms, other suitable polyhedron, spheres, cylinders, other suitable three-dimensional geometric shapes, or other suitable three-dimensional shapes. Example two-dimensional interfaces include squares, rectangles, pentagons, other suitable polygons, other geometric interfaces, or any other suitable two-dimensional shapes.

In some embodiments, a plurality of first level filters are displayed on the two-dimensional interface. For example, first level filters can be displayed for the data depicted in the displayed data illustration. In some embodiments where the two-dimensional interface is a geometric interface, such as a square, the first level filters can be displayed along a perimeter of the two-dimensional interface. A user may select one of the first level filters, and the data illustration may be filtered according to the selection. Filtering the data illustration can include dynamically altering the graphical user interface such that a second data illustration is displayed in the two-dimensional interface and dynamically displaying second level filters for filtering the second data illustration. The second level filters can be based on the selected first level filter. In some embodiments where the two-dimensional interface is a geometric interface, such as a square, the second level filters can be displayed along an inner perimeter of the two-dimensional interface, such as between the second data illustration and the perimeter of the two-dimensional interface (where the first level filters are displayed, in some examples).

In some embodiments, the two-dimensional interface can be a side or cross-section of a three-dimensional interface. For example, the two-dimensional interface described above, or a first two-dimensional interface, may correspond to a first facet of data, and a second side or cross-section of the three-dimensional interface, or a second two-dimensional interfere, may correspond to a second facet of data. In an example, the two-dimensional interfaces can be squares and the three-dimensional interface can be a cube in a sample implementation. In some embodiments, a selection for the second facet of data can be received from the user, and the three-dimensional interface can be altered to display the second facet of data. For example, the three-dimensional interface can be dynamically rotated from the first side or cross-section to the second side or cross-section to dynamically display the second two-dimensional interface. The second two-dimensional interface can display a third data illustration that depicts the second facet of data.

In some embodiments, a filter may be selected for the first data illustration displayed on the first two-dimensional interface prior to the rotation. For example, a user may select a filter for the first data illustration (e.g., from among a plurality of first level filters displayed along a perimeter of the first two-dimensional interface). As described herein, the first data illustration may be filtered according to the selection to display a second data illustration, and a plurality of second level filters can be displayed. In some embodiments, when a selection for a second facet of data is received after one or more filters have been implemented, the data illustration associated with the second facet of data dynamically displayed after the rotation may be filtered according to the one or more implemented filters. For example, where a second data illustration displayed on the first two-dimensional interface is filtered according to a selected filter, the third data illustration dynamically displayed after rotation to the second two-dimensional interface can be filtered according to the same selected filter. In other words, the second data illustration and the third data illustration may be filtered according to the same filter (which is selected prior to rotation of the three-dimensional interface).

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

FIG. 1 is a block diagram of a computer server/system 100 in accordance with exemplary embodiments. As shown in FIG. 1, system 100 may include a bus device 112 and/or other communication mechanism(s) configured to communicate information between the various components of system 100, such as processor 122 and memory 114. In addition, communication device 120 may enable connectivity between processor 122 and other devices by encoding data to be sent from processor 122 to another device over a network (not shown) and decoding data received from another system over the network for processor 122.

For example, communication device 120 may include a network interface card that is configured to provide wireless network communications. A variety of wireless communication techniques may be used including infrared, radio, Bluetooth®, Wi-Fi, and/or cellular communications. Alternatively, communication device 120 may be configured to provide wired network connection(s), such as an Ethernet connection.

Processor 122 may include one or more general or specific purpose processors to perform computation and control functions of system 100. Processor 122 may include a single integrated circuit, such as a micro-processing device, or may include multiple integrated circuit devices and/or circuit boards working in cooperation to accomplish the functions of processor 122. In addition, processor 122 may execute computer programs, such as operating system 115, dynamic user interface modules 116, and other applications 118, stored within memory 114.

System 100 may include memory 114 for storing information and instructions for execution by processor 122. Memory 114 may contain various components for retrieving, presenting, modifying, and storing data. For example, memory 114 may store software modules that provide functionality when executed by processor 122. The modules may include an operating system 115 that provides operating system functionality for system 100. The modules can include an operating system 115, dynamic user interface modules 116 configured to dynamically display data visualizations, as well as other applications modules 118. Operating system 115 provides operating system functionality for system 100. Dynamic user interface modules 116 may include software executables or application program interfaces ("APIs") that provide two-dimensional and/or three-dimensional graphical user interfaces for display, such as on display 124.

Non-transitory memory 114 may include a variety of computer-readable medium that may be accessed by processor 122. For example, memory 114 may include any combination of random access memory ("RAM"), dynamic RAM ("DRAM"), static RAM ("SRAM"), read only memory ("ROM"), flash memory, cache memory, and/or any other type of non-transitory computer-readable medium.

Processor 122 is further coupled via bus 112 to a display 124, such as a Liquid Crystal Display ("LCD"). A keyboard 126 and a cursor control device 128, such as a computer mouse, are further coupled to communication device 112 to enable a user to interface with system 100.

In some embodiments, system 100 can be part of a larger system. Therefore, system 100 can include one or more additional functional modules 118 to include the additional functionality. Other applications modules 118 may include the various modules of the engagement engine ("EE") embedded in Oracle® Cloud, for example. A database 117 is coupled to bus 112 to provide centralized storage for modules 116 and 118 and to store, for example, data for dynamic display, such a hierarchical data set, and or any other suitable data. Database 117 can store data in an integrated collection of logically-related records or files. Database 117 can be an operational database, an analytical database, a data warehouse, a distributed database, an end-user database, an external database, a navigational database, an in-memory database, a document-oriented database, a real-time database, a relational database, an object-oriented database, or any other database known in the art.

Although shown as a single system, the functionality of system 100 may be implemented as a distributed system. For example, memory 114 and processor 122 may be distributed across multiple different computers that collectively make up system 100. In one embodiment, system 100 may be part of a device (e.g., smartphone, tablet, computer, etc.), and system 100 may provide manipulation of dynamically rendered content of webpages.

In an embodiment, system 100 may be separate from the device, and may remotely provide the aforementioned functionality for the device. Further, one or more component of system 100 may not be included. For example, for functionality as a user or consumer device, system 100 may be a smartphone or other wireless device that includes a processor, memory, and a display, does not include one or more of the other components shown in FIG. 1, and includes additional components not shown in FIG. 1, such as an antenna, transceiver, or any other suitable wireless device component.

FIGS. 2A-2D illustrate example user interfaces for dynamically filtering a data illustration on a graphical user interface according to an example embodiment. In some embodiments, interfaces depicted in FIGS. 2A-2D, 4, 4A-4D, and 5 can be implemented using a system similar to system 100 of FIG. 1. For example, one or more elements of system 100 may be used to generate the described graphical user interfaces, for instance on display 124.

Figure 2A:
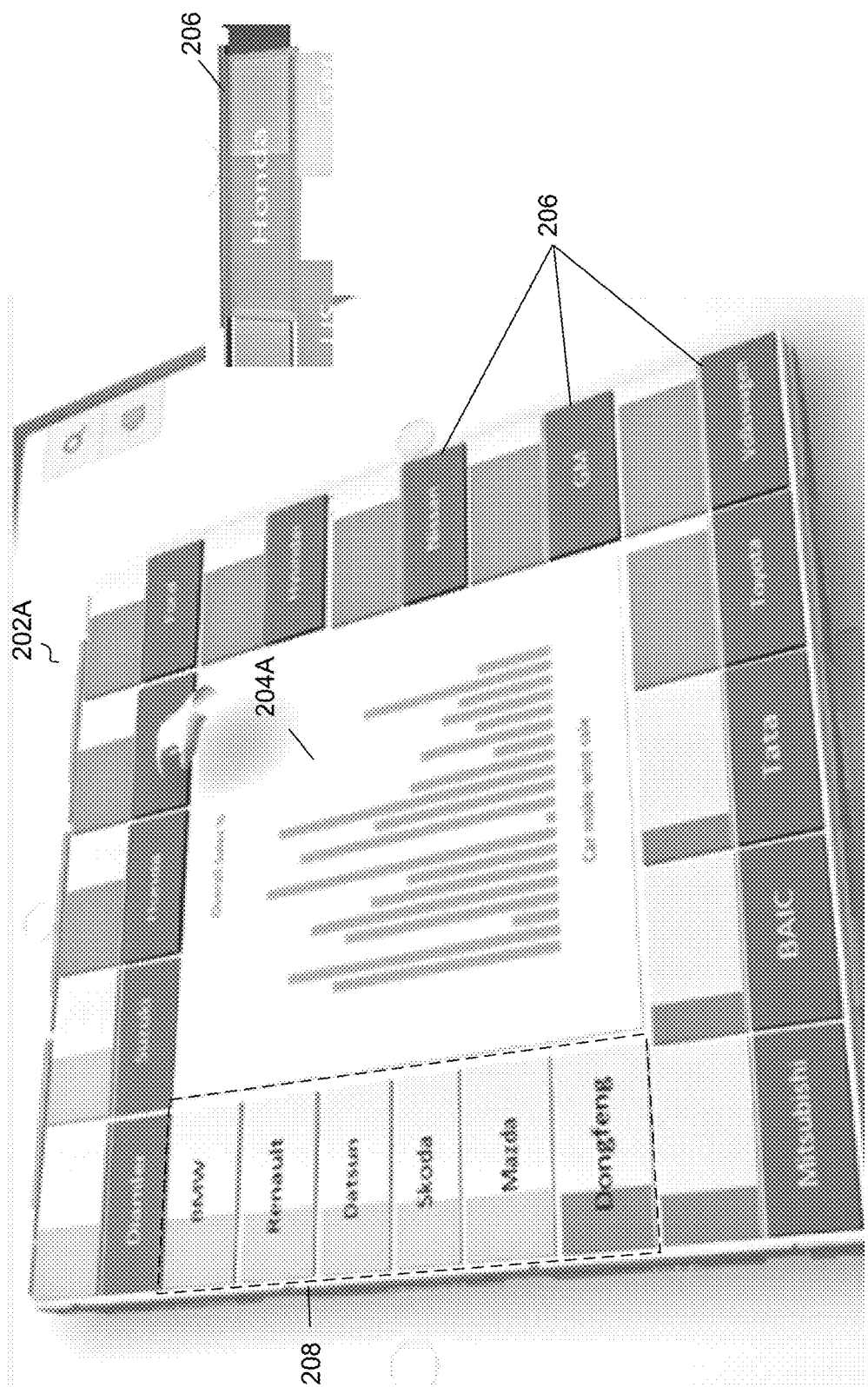
FIGS. 2A-2D illustrate example user interfaces for dynamically filtering a data illustration on a graphical user interface according to an example embodiment.

As shown in FIG. 2A, interface 202A can include data illustration 204, first level filters 206, and squeeze region 208. Interface 202A can be a two-dimensional graphical user interface for displaying a facet of data, for instance using data illustration 204, and a plurality of filters, such as first level filters 206. Squeeze region 208 can include potential first level filters that can be selected after a user interacts with interface 202A. While interface 202A is depicted as a square, interface 202A can be any other suitable two-dimensional interface, such as a rectangle, pentagon, other suitable polygon, other geometric interface, or any other suitable two-dimensional shape.

Data illustration 204A can depict a facet of data using a graph, chart, table, grid, or any other data illustration. A facet of data may be an aspect or attribute of a particular data set. For example, a data set of car sales can include a number of different aspects or attributes. The facet of data depicted in data illustration 204 is an overall percentage of world-wide sales for individual car manufacturers, and the data is depicted as a bar graph that shows sales percentage per car manufacturer. The depicted percentage can be the percent of the global car sales that correspond to each individual manufacturer. Other example facets of data include gross world-wide car sales, car sales by segment, year over year sales, quarterly sales, revenue for any of the previous sales data facets, and any other suitable data facet.

As will be further described, data illustration 204A can be filtered according to one or more filters, such as first level filters 206. The various facets of data for a depicted data illustration are based on the selected filters and the current data illustrated. These example refer to car sales as a data set, but any other suitable data set may be implemented that can include a variety of potential facets of data.

In some embodiments, interface 202A can be used to display a data set organized in a hierarchy. For example, a data set may include parent nodes, child nodes, grandchild nodes, and so on. First level filters 206 may be a list of parent nodes within the hierarchy. As will be discussed below, one of first level filters 206 may be selected to filer data illustration 204A. In an example that implements a hierarchy, selecting a first level filter 206 may be akin to drilling-down the hierarchy based on a selected parent node. Second level filters can be displayed that are akin to child nodes for the selected parent. Selection of a second level filter may be akin to drilling-down the hierarchy based on the selected child node. Third level filters can be displayed that are akin to grandchild nodes. The drilling-down of a data set organized in a hierarchical structure can continue based on further levels of the hierarchy. FIG. 6 illustrates an example hierarchical data set that will be further discussed with reference to FIGS. 5A-5D.

For example, in the illustrated embodiment, the manufacturers listed as first level filters 206 can be parent nodes in a hierarchical data set. Selection of one of the manufacturers can drill-down the hierarchy to display second level filters that correspond to child nodes of the selected parent (e.g., countries in which the selected manufacturer sold cars), as will be further discussed below.

In some embodiments, first level filters 206 can be displayed along a perimeter of interface 202A. In the depicted example, first level filters 206 are set along a square perimeter of interface 202A, however interface 202A can be any suitable two-dimensional interface and first level filters 206 can be set along the perimeter of this suitable two-dimensional interface. In other embodiments, first level filters 206 can be displayed at other portions of interface 202A.

In some embodiments, first level filters 206 can be displayed along with an indicator, such as a quality indicator. For example, the quality indicator can be based on the potential results of applying one of the first level filters 206 to the data depicted in data illustration 204A. With reference to the depicted sales data, the indicator can indicate a sales volume of the corresponding first level filter 206. In an implementation that uses a hierarchical data structure, the quality indicator can indicate a number of child nodes for each of first level filters 206. The quality indicator may be a color, a fill level (e.g., a horizontal bar that is small, medium, or large, as illustrated in FIG. 2A), or any other suitable indicator.

In example depicted in FIG. 2A, first level filters 206 correspond to the car manufacturers depicted in the bar graph of data illustration 204A. Selection of one of filters 206 results in data illustration 204A being filtered according to that selection. For example, where a car manufacturer is selected, data illustration 204A will be filtered, and the data depicted can drill-down to data specifically for the selected car manufacturer, such as car sales for the selected car manufacturer per country. In an example that implements a hierarchical data set, selection of a car manufacturer can drill-down the hierarchy using the selected parent node.

In some embodiments, a user may interact with interface 202A using an interaction device or function. For example, a user may click or drag elements of interface 202A using a mouse, scroll wheel, touch capable display (e.g., interacting with a finger or stylus) or any other suitable interaction device or function. Interface 202A includes a cursor, and a user may use the cursor to select one of first level filters 206, in particular the "Honda" filter (or parent node). Upon selection of the "Honda" filter, the displayed content can be dynamically altered, for instance using a transition. The transition can alter the displayed content to transition between interfaces illustrated in FIGS. 2A-2D, for example using motion or animation.

Figure 2B:
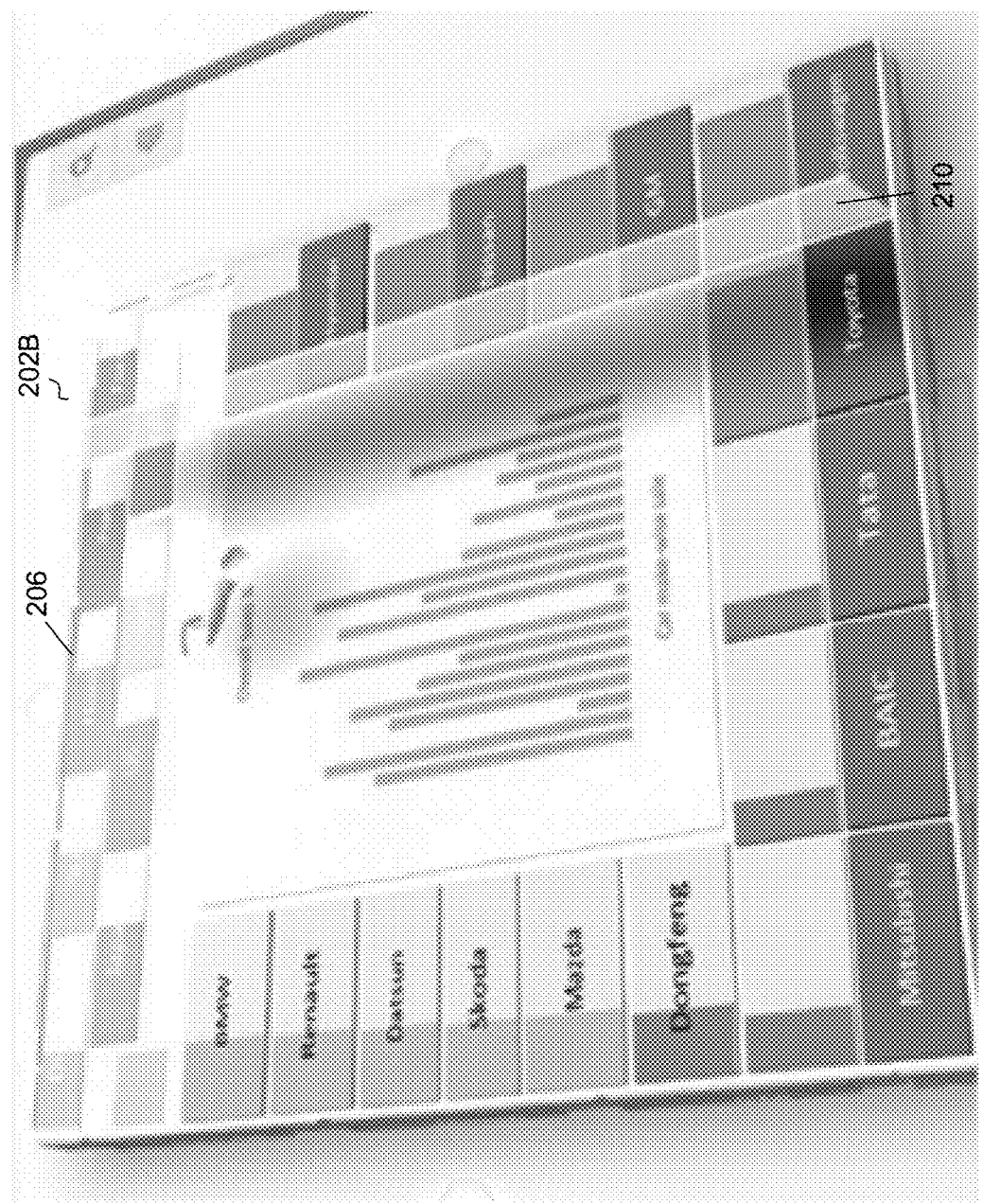
Figure 2C:
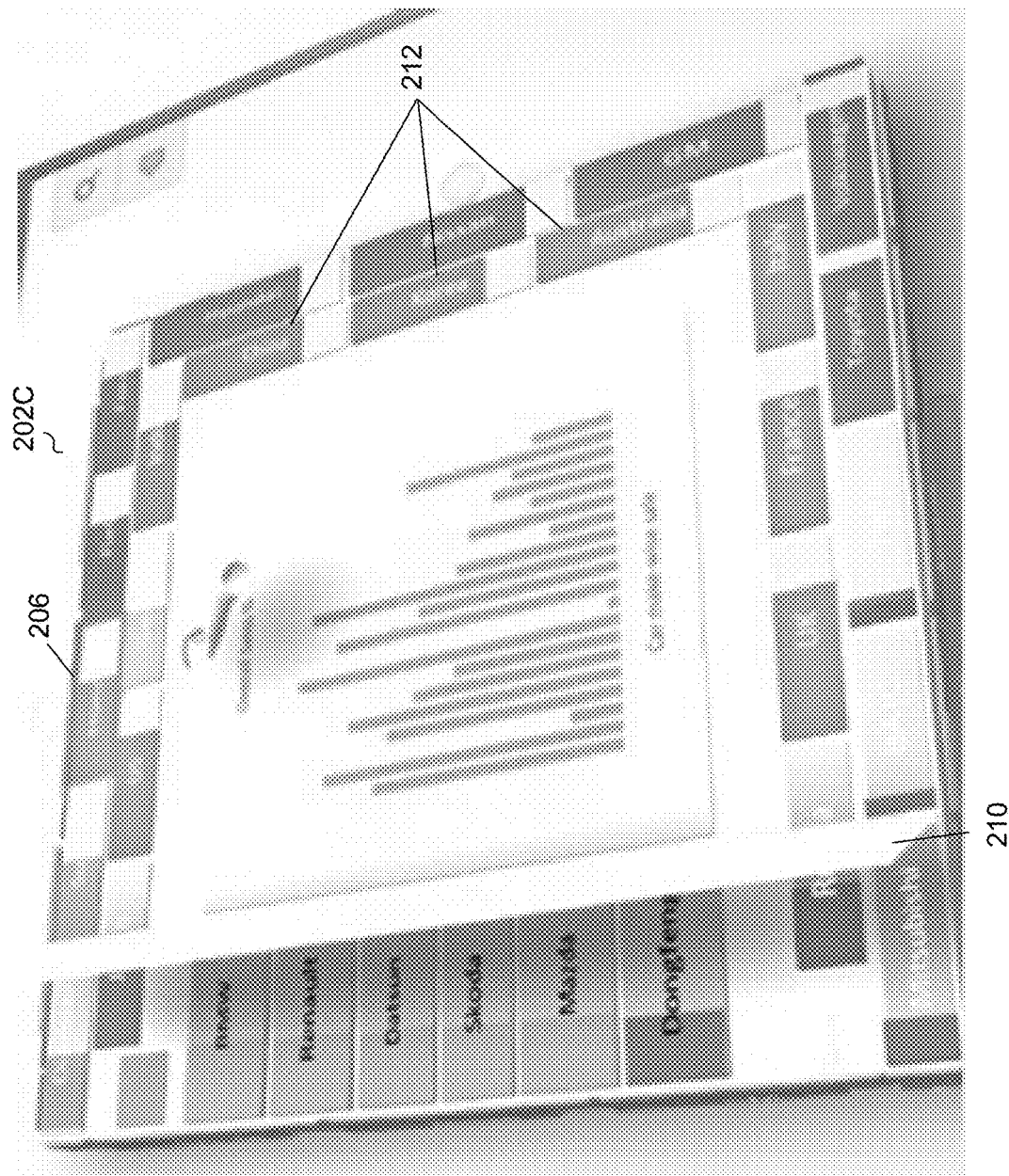
Figure 2D:
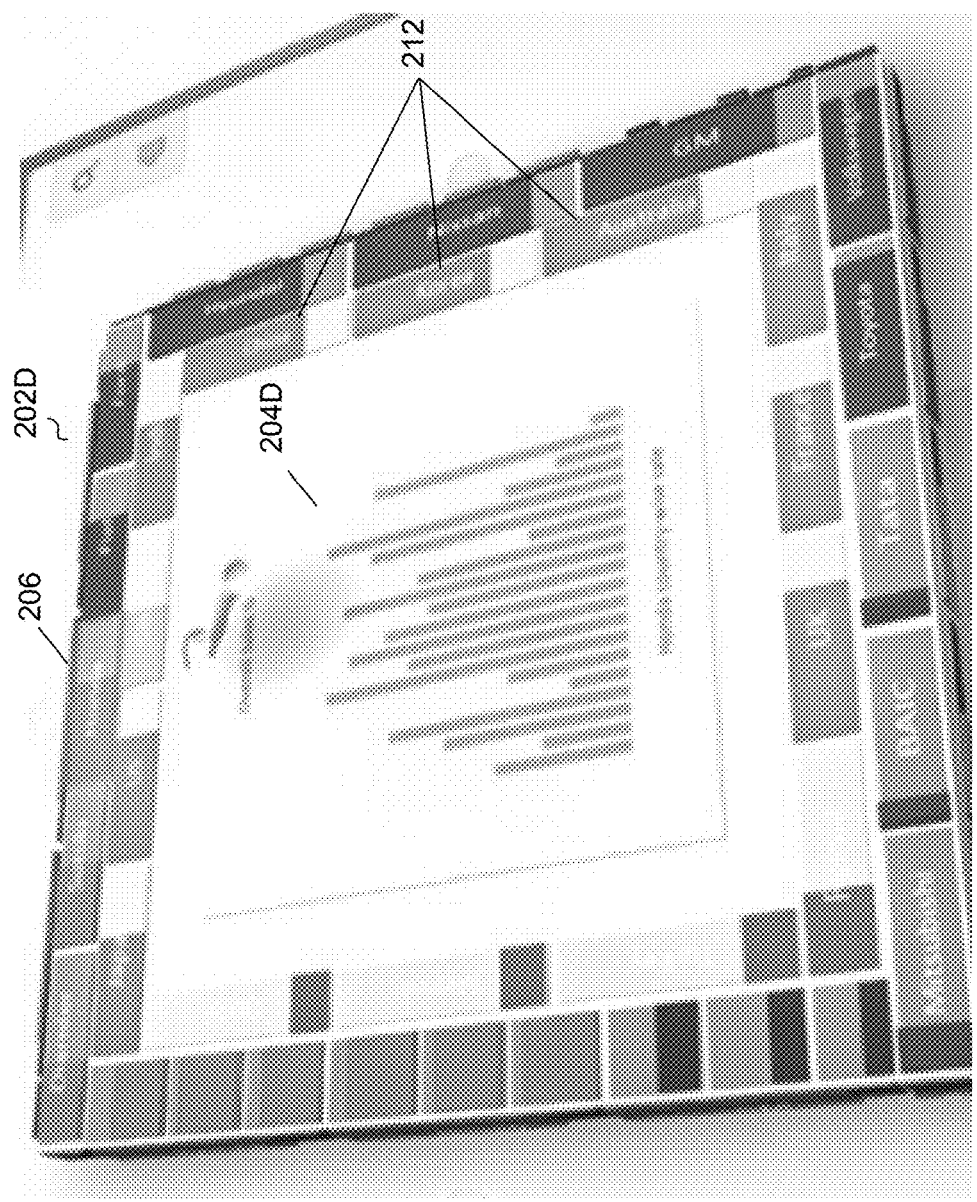

FIG. 2B illustrates interface 202B that represents a transition after a first level filter 206 that corresponds to "Honda" is selected by a user. The transition can include a transition element 210, depicted as a transparent "blind" being rotated, in this instance being rotated away from first level filters 206, where this transition takes place on a first side of interface 202B. FIG. 2C illustrates interface 202C that similarly continues the transition after FIG. 2B. In FIG. 2C, interface 202C also depicts a transition element 210 that is a transparent "blind" being rotated, where this transition takes place on a second side of interface 202C. FIG. 2C also depicts second level filters 212, which will be further described with reference to FIG. 2D. As can be seen by the transition between FIGS. 2B and 2C, the rotation of transition element 210 on the right side of interface 202C dynamically displays second level filters 212. For example, the transparent "blind" represented by transition element 210 can appear as though it is uncovering second level filters 212. In various embodiments, transition elements 210 on each side of interface 202C can be used to dynamically display, or "uncover," second level filters 212. While FIGS. 2A-2D illustrate an example transition, any other suitable transition can be implemented FIG. 2D illustrates interface 202D after the transition triggered by a user selecting a first level filter 206 that corresponds to "Honda". FIG. 2D continues to display first level filters 206 along a perimeter of interface 202D, and further dynamically displays second level filters 212 across an inner perimeter of interface 202D. For example, the inner perimeter can be located between the perimeter (where first level filters 206 are displayed) and data illustration 204D. In some embodiments, first level filters 206 can be displayed with an indication that one of filters 206 has been selected (e.g., corresponding to "Honda") and that the remaining first level filters 206 are no longer selectable, for example by displaying first level filters 206 as grayed out.

Data illustration 204D can represent data illustration 204A after being filtered according to the selected first level filter 206. For example, "Honda" can be selected by a user, and the world-wide car sales percentage data depicted in data illustration 204A can be filtered to show Honda world-wide car sales percentages by country in data illustration 204D. Second level filters 212 are data filters that can be used to filter the data depicted in data illustration 204D. In FIG. 2D, second level filters are countries in which "Honda" had car sales.

In some embodiments, second level filters 212 are based on the selected first level filter. In FIG. 2D, second level filters 212 represent countries in which Honda had car sales (e.g., U.S., Japan, UK, France, and the like). If a different first level filter were selected by the user (e.g., a different car manufacturer), second level filters specific to the selected first level filter would be displayed (e.g., countries in which the different car manufacturer had car sales). In this example, data illustration 204D would similarly be altered to dynamically display car sales by country for the different car manufacturer.

In an embodiment that implements a hierarchical data set, second level filters 212 can be the child nodes of a selected parent node (i.e., selected first level filter 206). In other words, "Honda" can be a parent node and the displayed second level filters 212 can be the child nodes for the parent node "Honda." As depicted, child nodes for the parent Node "Honda" can correspond to countries in which "Honda" cars have been sold. In this example, data illustration 204D displays data at a second level of the hierarchical data structure based on selection of the "Honda" parent node and the resultant drill-down of the structure. FIG. 6 illustrates an example hierarchical data set that will be further discussed with reference to FIGS. 5A-5D.

In some embodiments, selection of one of second level filters 212 will cause another dynamic transition in which data illustration 204D is further filtered to show "Honda" car sales within the selected country. Upon selection of one of second level filters 212 another transition similar to the transition illustrated by FIGS. 2A-2D can be triggered, where the data illustration within interface 202D is filtered according to the selected first level and second level filters. This transition process can also trigger dynamic display of third level filters according to the selected first level and second level filters. In some examples, when displaying third level filters, the first level filters 206 may be dynamically removed from interface 202D, and second level filters 212 can be displayed along the perimeter of interface 202D (where first level filters 206 were previously displayed). In these examples, third level filters can then be displayed along the inner perimeter of interface 202D (where second level filters 212 were previously displayed).

In embodiments that implement a hierarchical structure, selection of a second level filter 212 can be akin to selection of a child node, and the hierarchical structure can be drilled down another level based on the selection. For example, third level filters can be grandchild nodes for the selected child node. The data illustration displayed in interface 202D after selection of the child node can be data that reflects a third level drill-down of the hierarchical structure based on the selected parent node (first level filter) and child node (second level filter).

Figure 3:
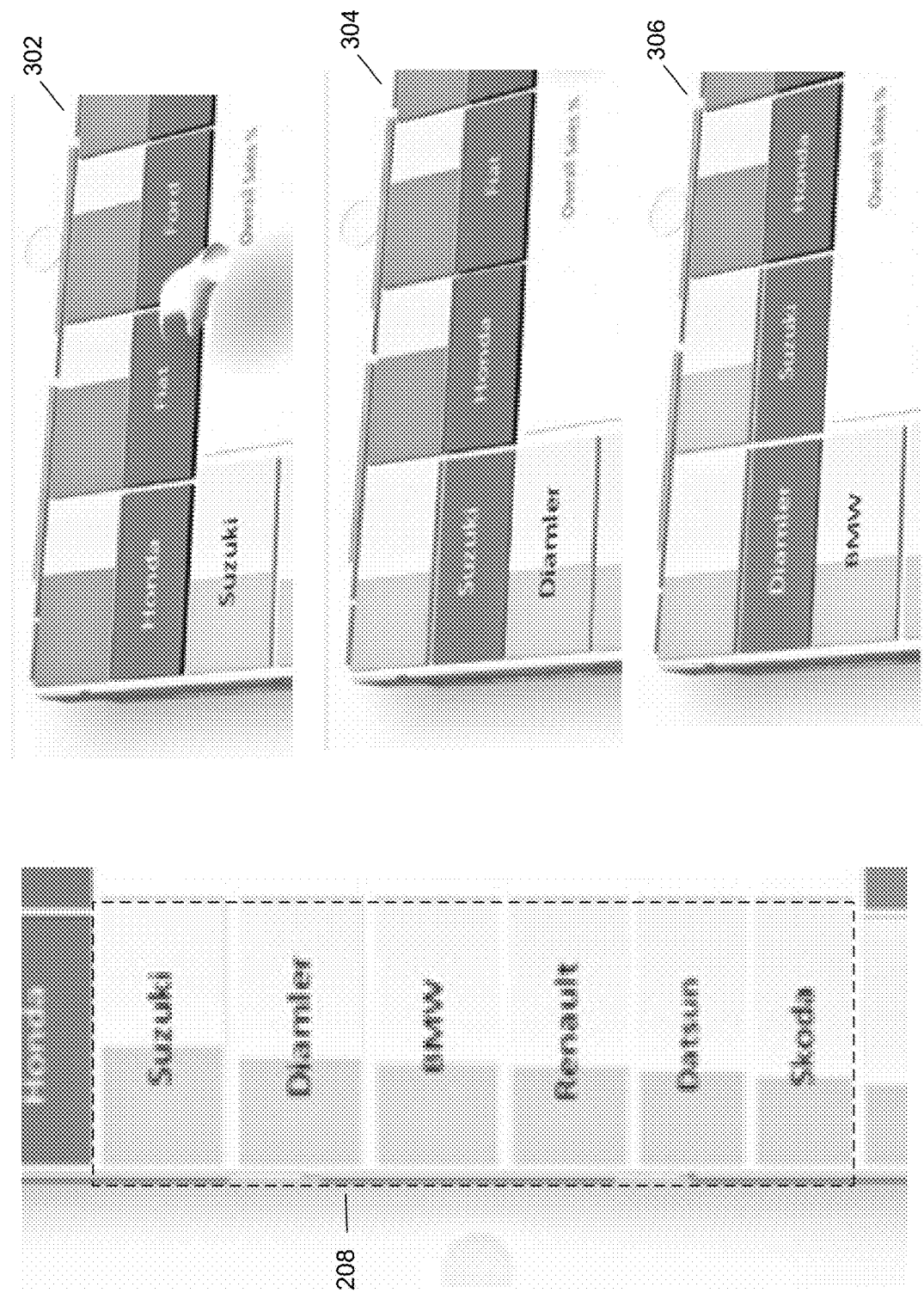
FIG. 3 illustrates example user interfaces for dynamically altering displayed data on a graphical user interface according to an example embodiment.

FIG. 3 illustrates a squeeze region 208 of interface 202A. For example, based on the data displayed within data illustration 204A, a number of first level filters 206 can be displayed. In some embodiments, the number of first level filters corresponds to a number of nodes at a given level of a hierarchical structure of a data set (e.g., parent nodes, child nodes, and the like). When the number of first level filters 206 exceeds a criteria or threshold, squeeze region 208 can be used to display the excess first level filters. For example, data illustration 204A illustrates world-wide car sales by manufacturer, and first level filters 206 correspond to various manufacturers with world-wide car sales. In this example, the number of manufacturers that correspond to first level filters 206 exceeds a threshold or criteria, or in other words the number of first level filters 206 are too numerous to be clearly displayed on interface 202A. Thus, interface 202A can display a portion of first level filters 206, such as along three sides of a perimeter of the interface. The remaining first level filters 206 can then be displayed within squeeze region 208. In various implementations, squeeze region 208 may be located at any suitable portion of interface 202A. In some embodiments, the filters within squeeze region 208 are not selectable by a user to filter data illustration 204A. However, in other embodiments the filters within squeeze region 208 are selectable by a user.

In an embodiment, first level filters 206 displayed along a perimeter of interface 202A can be scrollable. For example, input can be received from a user to scroll first level filters 206 along the perimeter of interface 202A. The input can include a click and drag interaction, a swipe interaction, a click of an element of interface 202A (not depicted) configured to scroll the filters, such as graphical direction arrows, or any other suitable input.

Interface view 302 of FIG. 3 depicts a first state of first level filters 206 prior to scrolling. The "Suzuki" filter is depicted as a top filter in squeeze region 208. After receiving input to scroll first level filters 206 to the right, the filters change to the state depicted in interface view 304, where "Suzuki" is depicted as having been scrolled out of squeeze region 208. Interface view 304 depicts "Diamler" is depicted as the top filter in squeeze region 208. Input can again be received, and the filters again change to the state depicted in interface view 306, where "Diamler" is depicted as having been scrolled out of squeeze region 208. Input can be received to scroll first level filters 206 in either direction, for example along the perimeter of interface 202A. In some embodiments, the filters housed in squeeze region 208 by default may correspond to lower priority filters, for example based on the quality indicated by a quality indicator associated with the first level filters 206.

FIGS. 2A-2D and the above descriptions provide for a dynamic drill-down approach to filter data illustrated in interfaces 202A, 202B, 202C, and 202D using a plurality of filters, such as first level, second level, and third level filters. In various embodiments, these filters are dynamic, each level filter being dependent on the selected level filter that preceded it. Upon selection of each filter, transitions can be used to dynamically display the next level data filters and the filtered data illustration. In embodiments that implement a hierarchical data structure, the selection of filters and the resultant data illustrations represent a drill-down of the hierarchical structure. Filters can be displayed along a perimeter and/or inner perimeter of an interface such as interface 202D, for example, along a perimeter and/or inner perimeter of a geometric shape, like a square. While the illustrated embodiments depict data illustrations in the two-dimensional interfaces 202A and 202D, any other suitable data representation may be displayed, or a dynamic element, such as a webpage, web application, dynamic webpage, or any other suitable dynamic software element can be displayed. For example, the dynamic element can be configured to display a data facet, as described within the disclosure.

The filtering and dynamic display functionality described in FIGS. 2A-2D can provide a number of benefits to users. For example, data displayed in interfaces 202A, 202B, 202C, and 202D can be easily comprehended and manipulated using the various elements of the interface. In addition, the data can be drilled-down using the different level filters to obtain a depth of information about various facets of a data set. As will be described with reference to FIGS. 5A-5D, other aspects of the disclosure allow for a depth of data to be explored along with a breadth of data using a dynamic interface.

Figure 4:
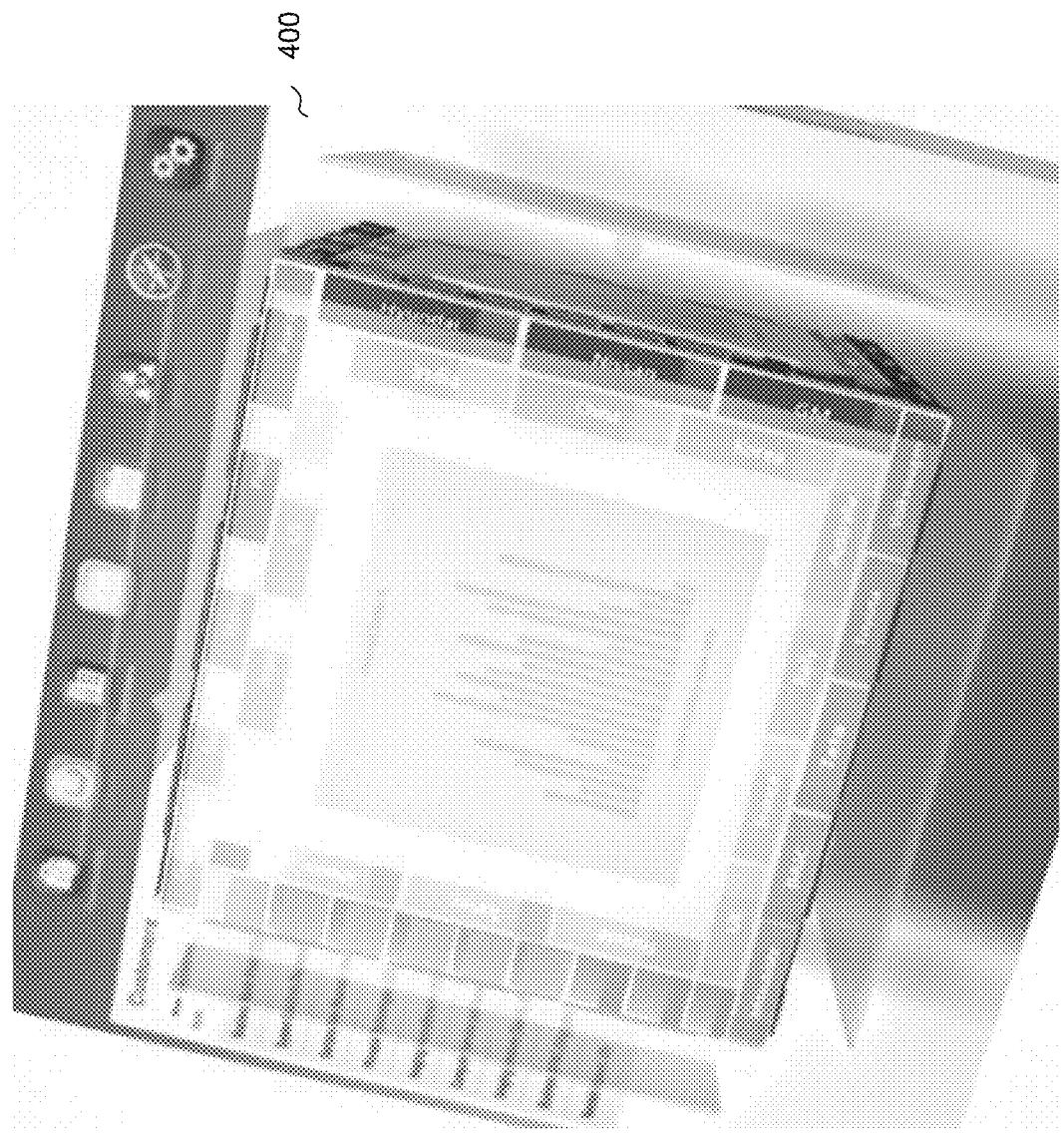
FIG. 4 illustrates an example three-dimensional graphical user interface according to an example embodiment.

FIG. 4 illustrates an example three-dimensional graphical user interface according to an example embodiment. Interface 400 is a three-dimensional interface for depicting a plurality of facets of a data set using various data illustrations and corresponding multi-level filters. While depicted as a cube, interface 400 can be any of a prism, rectangular prism, other suitable polyhedron, sphere, cylinder, other suitable three-dimensional geometric shape, or other suitable three-dimensional shape. In some embodiments, interfaces 202A or 202D of FIGS. 2A and 2D can be a two-dimensional side or cross-section of interface 400. For example, interface 400 can include a plurality of sides or cross-sections that are similar to interfaces 202A or 202D, each side displaying a different facet of a data set.

Figure 5A:
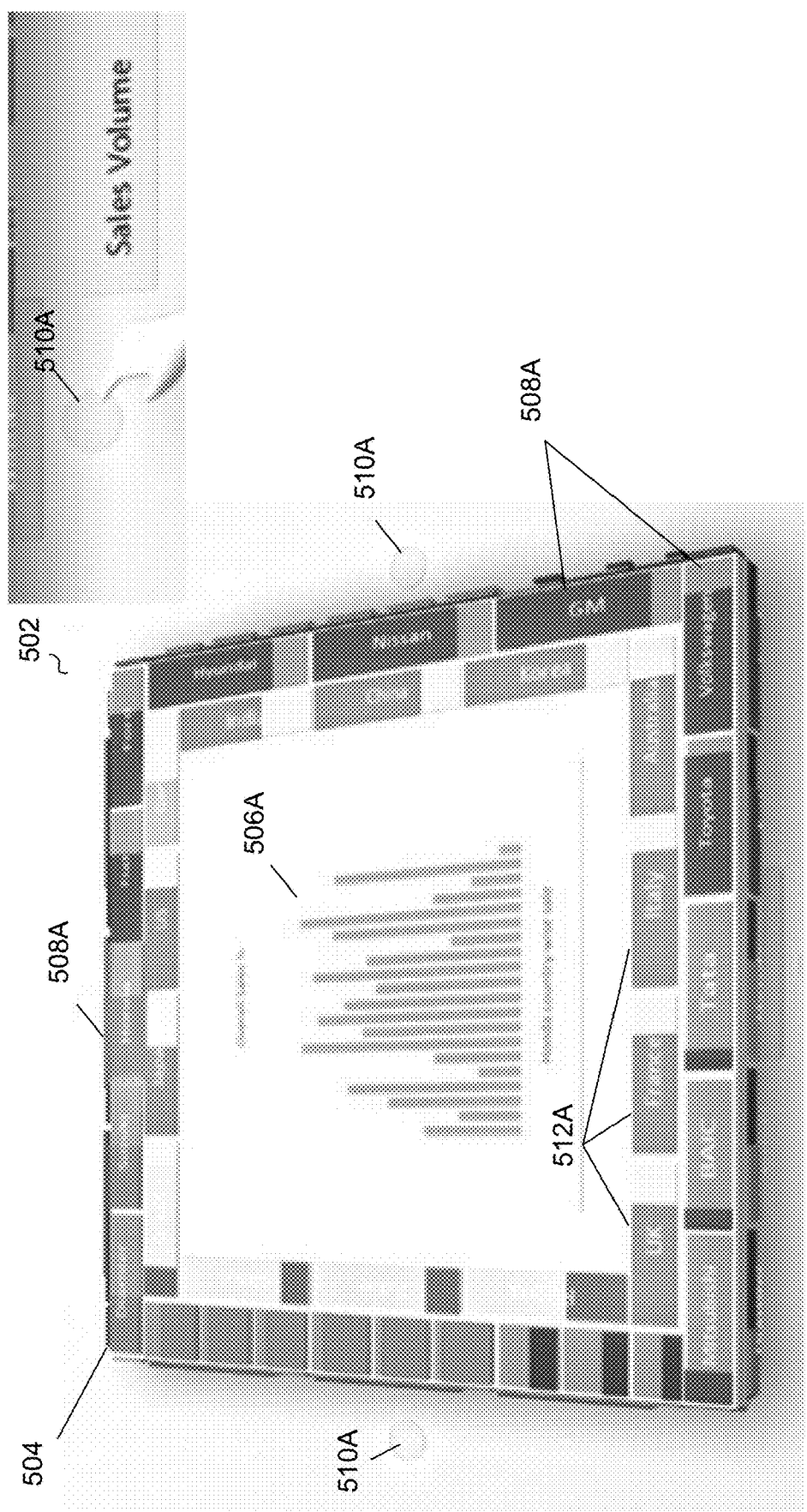
FIGS. 5A-5D illustrate example user interfaces for dynamically displaying facets of data on a three-dimensional graphical user interface according to an example embodiment.

FIGS. 5A-5D illustrate example user interfaces for dynamically displaying facets of data on a three-dimensional graphical user interface according to an example embodiment. For example, interface 502 can be a three-dimensional interface with a plurality of sides or cross-sections that is similar to interface 400 of FIG. 4. In various embodiments, a data facet is distinct from a data filter. For example, a data facet can correspond to a category or dimension of data, while a data filter can correspond to an element or node within the category or dimension. In the illustrated example, FIG. 5A depicts interface 504, which displays an "Overall Sales Percentage" data facet. The filters for the "Overall Sales Percentage" can be car makes at a first level, countries at a second level, and any other suitable "element" (e.g., hierarchical node) that can be used to filter the "category" of "Overall Sales Percentage". Other potential facets of data can be other variations of sales, such as "Year Over Year Sales", "Monthly Sales", "Quarterly Sales", other financial metrics such as "Profit and Loss" or "Revenue", and any other "category" of data that can be filtered or drilled down by "element". Data facets can be dependent on the particular data set being displayed on the three-dimensional interface, and the "categories" or "dimensions" that the particular data set can represent.

Interface 504 can be a two-dimensional side or cross-section of interface 500 that is similar to interface 202D of FIG. 2D. As described with reference to FIGS. 2A-2D, interface 504 depicts an embodiment that has been filtered or drilled-down according to selected first level filter 508A (which corresponds to a "Honda" filter or hierarchical node). Thus, data illustration 506A has been filtered according to the selected first level filter 508A or data illustration 506A represents a hierarchical data set drilled down according to the selected node. Second level filters 512A can be displayed based on the selected first level filter 508A or second level filters may represent child nodes of the selected parent node (i.e., "Honda"). By way of example, an organization, such as "ABC Corp" that sells vehicles across the globe can use one or more project modules to track performance data. The organization can have separate projects to track sales of cars by make (e.g., Honda, Toyota, and the like) and sub-projects to track country-wise sales. In some embodiments, interface 502 can be displayed in association with a dashboard for these projects and/or sub-projects.

In some embodiments, rotation points 510 are graphical user interface elements used to rotate interface 502. For example, a user can select (click or tap) one of rotation points 510 to rotate interface 502 to a new two-dimensional side or cross-section. Each side or cross-section of interface 502 can correspond to a different facet of data, and a user can use rotation points 510 to navigate to different sides of cross-sections of the interface. In some embodiments, a user can swipe or click and drag to rotate interface 502 to, or may use any other suitable interaction with interface 502.

Figure 5B:
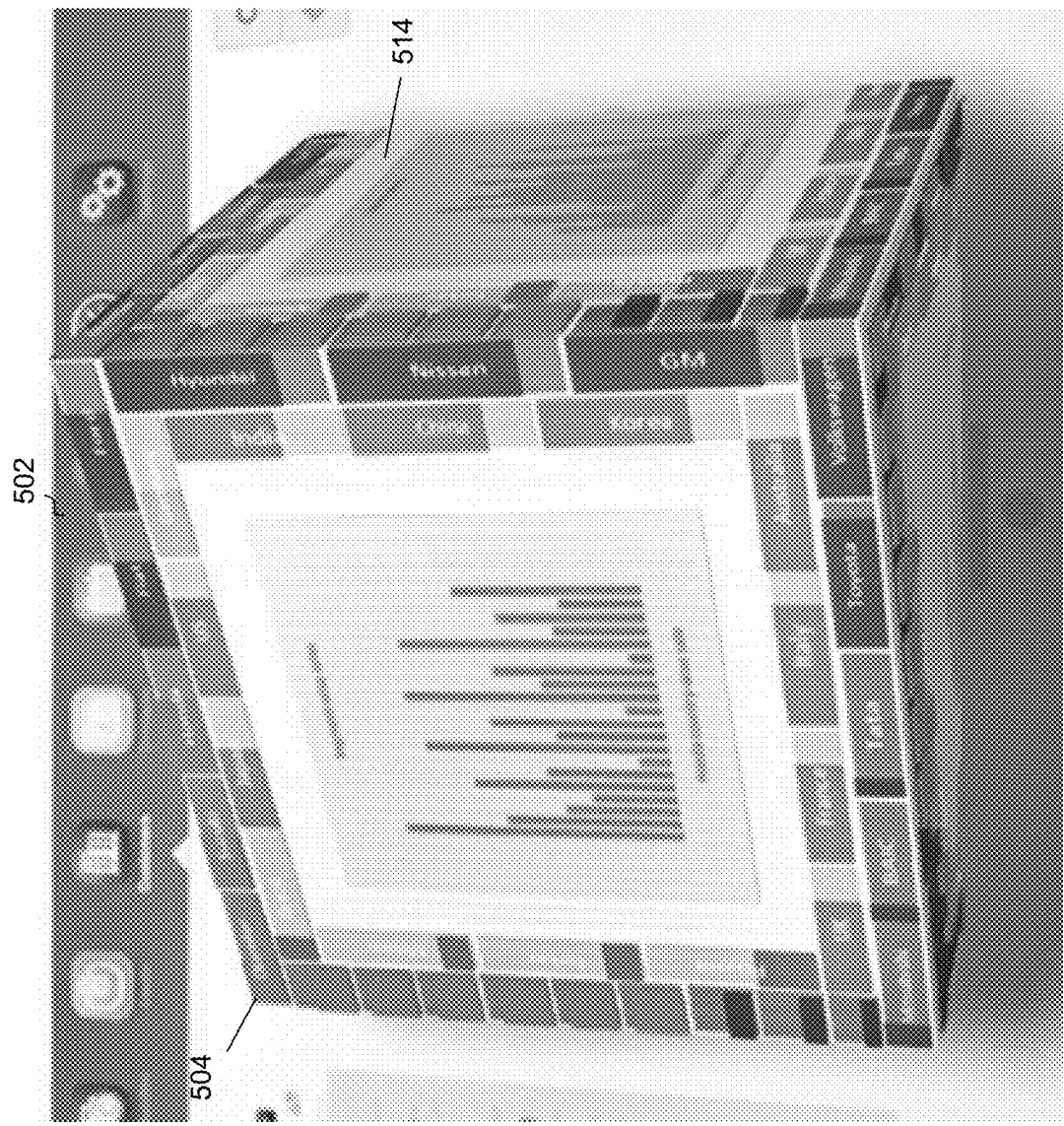
Figure 5C:
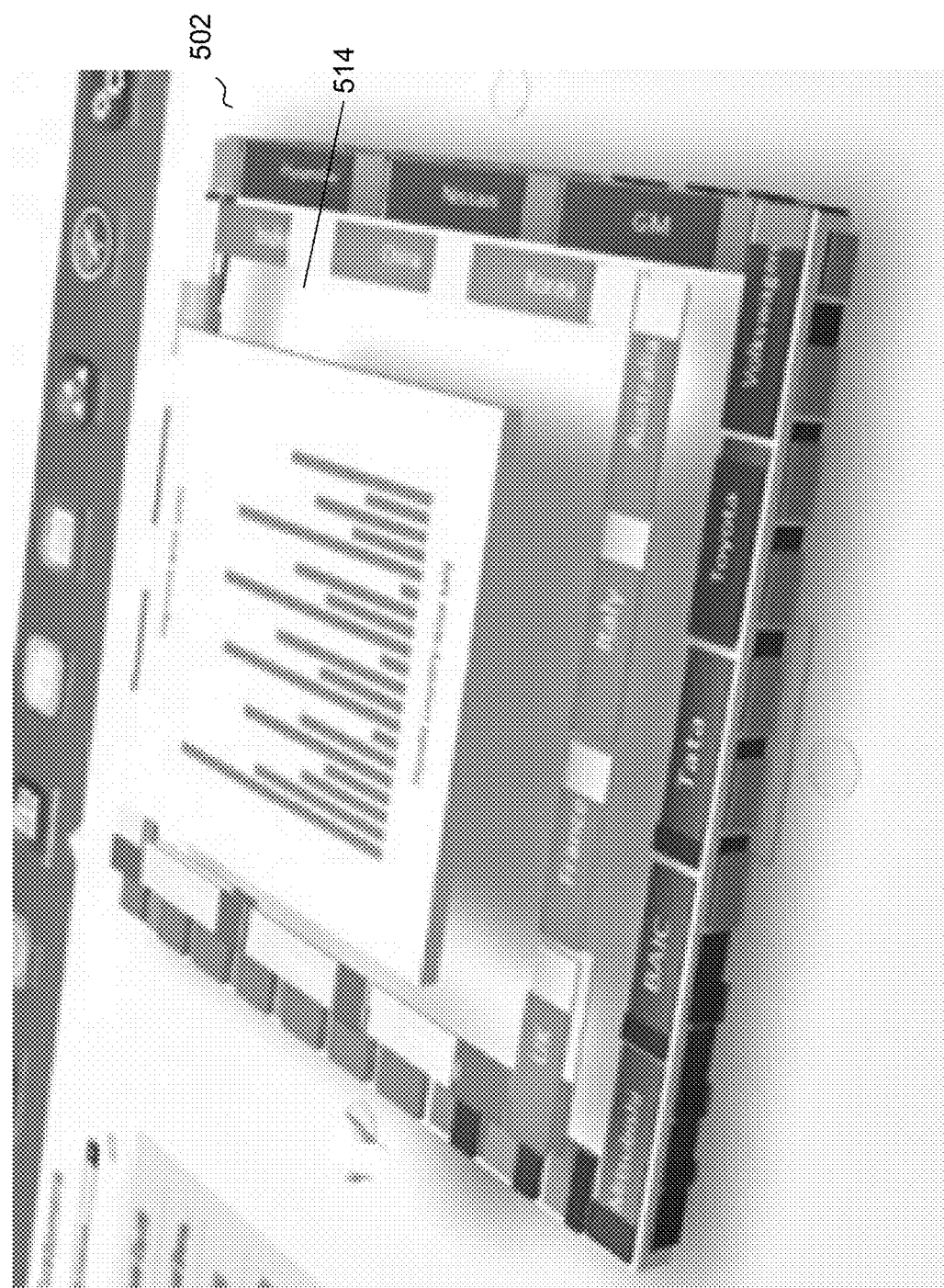
Figure 6:
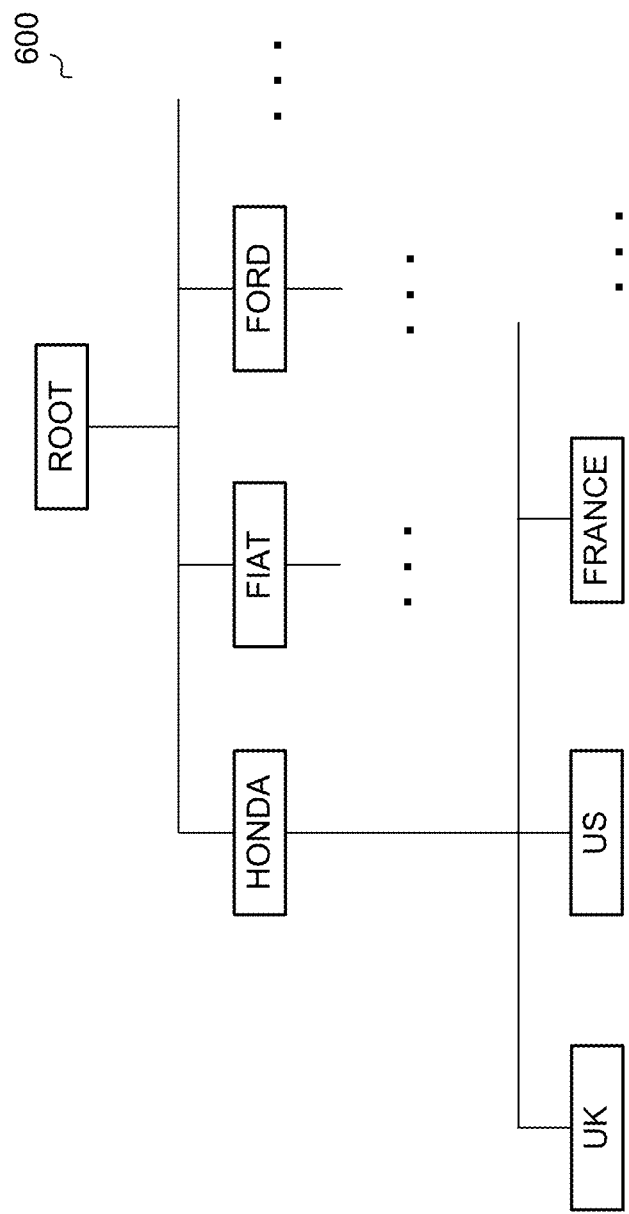
FIG. 6 illustrates an example hierarchical data set according to an example embodiment.

In an embodiment, a user may select rotation point 510 on the right side of interface 502 to rotate the interface towards the selected rotation point. FIG. 5B illustrates a transition motion or animation, where interface 502 is rotating from interface 504 which corresponds to a first side or cross-section of the interface to interface 514 which corresponds to a second side or cross-section of the interface. FIG. 5C illustrates the transition after FIG. 5B, where interface 504 has been rotated to interface 514, and the interface is setting (or sinking) back into a configuration where a user can manipulate the interface. For example, interface 514 can include a plurality of layers (first level filters, second level filters, data illustration, and the like), and the layers may set or sink separately in a specified order to terminate a rotation motion or animation.

Figure 5D:
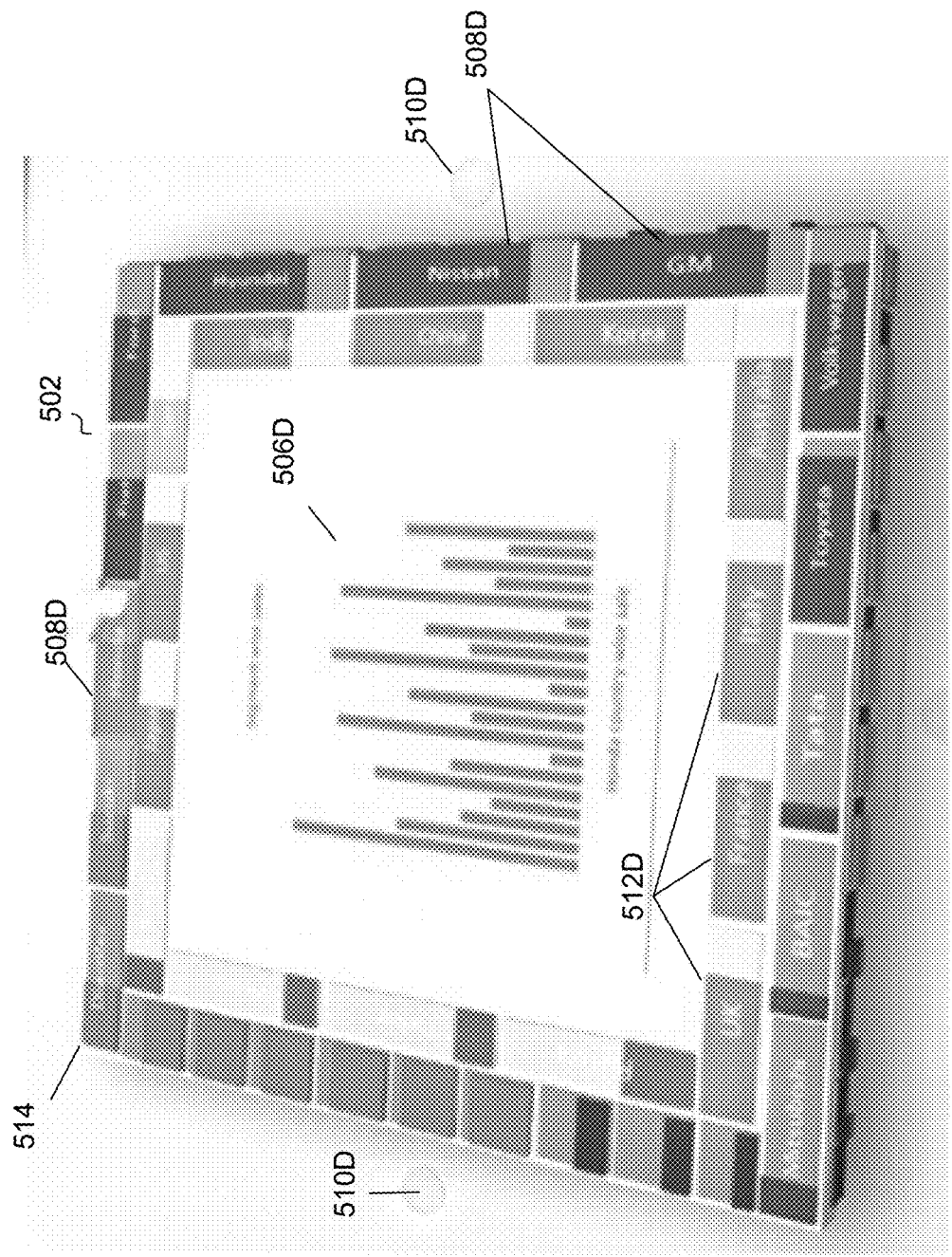

FIG. 5D illustrates interface 502 after rotation from a first side or cross-section (e.g., interface 504) to a second side or cross section (e.g., interface 514). In some embodiments, the data represented by interface 514 may be filtered similar to the data represented by interface 504 prior to rotation. For example, first level filters 508D and second level filters 512D may be similar or substantially similar to first level filters 508A and second level filters 512A. In addition, the first level filter 508A selected to filter interface 504 can be similar or the same as the first level filter 508D selected to filter interface 512. Accordingly, data illustration 506D, representing a second facet of data, can be filtered similar to data illustration 506A, representing a first facet of data. In the illustrated example, the second facet of data depicted by interface 514 is "Segment-wise Sales", however, any other suitable data facet can be implemented.

In some embodiments, the first facet of data and second facet of data may be organized according to the same hierarchy. In other words, the data "categories" represented by the first facet of data and second facet of data can be filtered or drilled-down according to the same hierarchy (e.g., hierarchy 600 of FIG. 6). For example, the data represented by interface 514 can be drilled-down to the same level on a hierarchy as the data represented by interface 504 prior to rotation. Hierarchy 600 of FIG. 6 depicts a data hierarchy with car manufacturer as parent nodes and countries as child nodes. In the illustrated embodiment, interface 504 is drilled down to the "Honda" node of the hierarchy, where second level filters 512A represent child nodes of the "Honda" parent node. Similarly, interface 514 can be drilled down to the "Honda" node of the hierarchy, where second level filters 512D represent child nodes of the "Honda" parent node. In other words, rotation of interface 502 to different sides or cross-sections can display different facets of data at a certain drill-down level of a hierarchical data set. In some embodiments, the hierarchical data structure can have many more levels, where the depicted hierarchy is a subset of a larger hierarchy and/or the depicted root node can be a hierarchical structure itself.

In some embodiments, one or more sides or cross-sections of interface 502 (or corresponding facets of data) can be locked such that filtration or hierarchical drill-down on other sides or cross-sections does not change the state (or data displayed) on the locked sides or cross-sections. For example, a memory function allows a side or cross-section of interface 502 to be drilled down or filtered to a certain state and locked at that state, where drill-down or filtration of other sides or cross-sections of interface 502 does not alter the locked side or cross-section. Some examples can include a default trigger (such as a clickable user interface element) that resets the interface 502 to a default setting (e.g., resets the filtration of data illustrations or drill-down of a hierarchy). In some implementations, one or more filters for interface 514 may be different from one or more filters for interface 504, for instance based on a difference between the first facet of data and the second facet of data.

In some embodiments, interface 502 can be rotated to any number of sides or cross-sections to display any number of different facets of the data set. For example, in a cube implementation, interface 502 can have six sides and display six different facets of data. In some embodiments, facet queuing can be implemented, for example to expand the number of displayable data facets to more than a number of sides for the interface 502 (e.g., to greater than six). A user can trigger an interaction with one of rotation points 510 (e.g., using a mouse over) such that a user interface element is dynamically displayed that lists a number of potential data facets to be displayed on the side or cross-section of interface 502 that corresponds to the rotation point. In other words, the corresponding side or cross-section can have two or more data facets queued for display. The user can select one of the queued data facets, and interface 502 can be rotated to a side or cross-section and the selected data facet can be displayed. In an embodiment, facets queued for a given rotation point 510 can include sales related facets, such as "Year Over Year Sales", "Monthly Sales", "Quarterly Sales", and the like. In these examples, queued facets can be grouped according to a group or theme, such as sales.

In a sphere implementation, rotation points can be displayed along a circumference of a circle that is a cross-section of the sphere, and facet queuing can be used for different rotation points. When a facet is selected from a queue that corresponds to a particular rotation point, the sphere can rotate in the direction of the particular rotation point to display the relevant facet of data. While data facets have been described with reference to data illustrations and filters, data facets can include textual info, charts, figures, other independent components, other representations of data, or any other suitable information.

In some embodiments, interface 502 can be searched using, for example, a free form search string input by a user. For example, in an implementation that uses a hierarchical data set, one or more parent nodes, child nodes, grandchild nodes, or a combination of these, can be returned based on matches to a user's search string. In some embodiments, a user interface element associated with a user search may be displayed that, when selected, dynamically displays a search box for text input. After a user begins typing, an autocomplete feature may be implemented, for instance that auto-completes potential filters that correspond to inputted characters, such as parent nodes, child nodes, grandchild nodes, and the like. Search results such as filters or nodes that correspond to the user's search string can be displayed. In some embodiments, selection of one of the search results dynamically filters interface 502 (e.g., one or more sides or cross-sections of interface 502) such that the data displayed by the interface is filtered (or drilled-down to) according to the selected filter.

In an example implementation, a three-dimensional interface, such as a cube, can be rotated to a first side or cross-section that displays a data facet that corresponds to an overview of an individual stock's performance, including for instance a share price. The three-dimensional interface can be rotated to different sides or cross-sections that display different data facets for the individual stock, such as a market cap for the corresponding company, profit and loss for the corresponding company, price over earning ratios for the stock, other financial metrics for the stock or corresponding company, and the like. In this embodiment, a filter can be applied to a displayed side or cross-section (e.g., displayed data facet) which can be a time range filter, such as 3 months, 6 months, a year, and the like, or a time granularity filter, such as monthly, quarterly, yearly, and the like. This filter can then be applied to one or more of the remaining sides or cross-sections of the interface, where rotation to different sides or cross-sections results in displayed data facets that are filtered according to the applied filter.

Embodiments include a three-dimensional interface with a plurality of two-dimensional sides or cross-sections that display different facets of data. The three-dimensional interface provides a number of advantages over conventional data interfaces. For example, embodiments where the filtration for one side is maintained while rotating the interface can display depth for a first facet of data while also providing functionality to dynamically display breadth by rotating the interface to a second side or cross-section that displays a second facet of data. In addition, the breadth of data is also displayed with depth when filtration is maintained, thus allowing a user to explore different facets of data at a detailed view. For example, when the multi-level filters are used to drill-down a hierarchical data set, rotation to different sides of the interface can provide a detailed look at the drilled-down hierarchy across a variety of data facets. In addition, the various rotation and filtration (drill-down) functionalities provide the user an intuitive interface to explore complex data and the dynamic display of data illustrations and filters provides the user a comprehendible view of this complex data.

Figure 7:
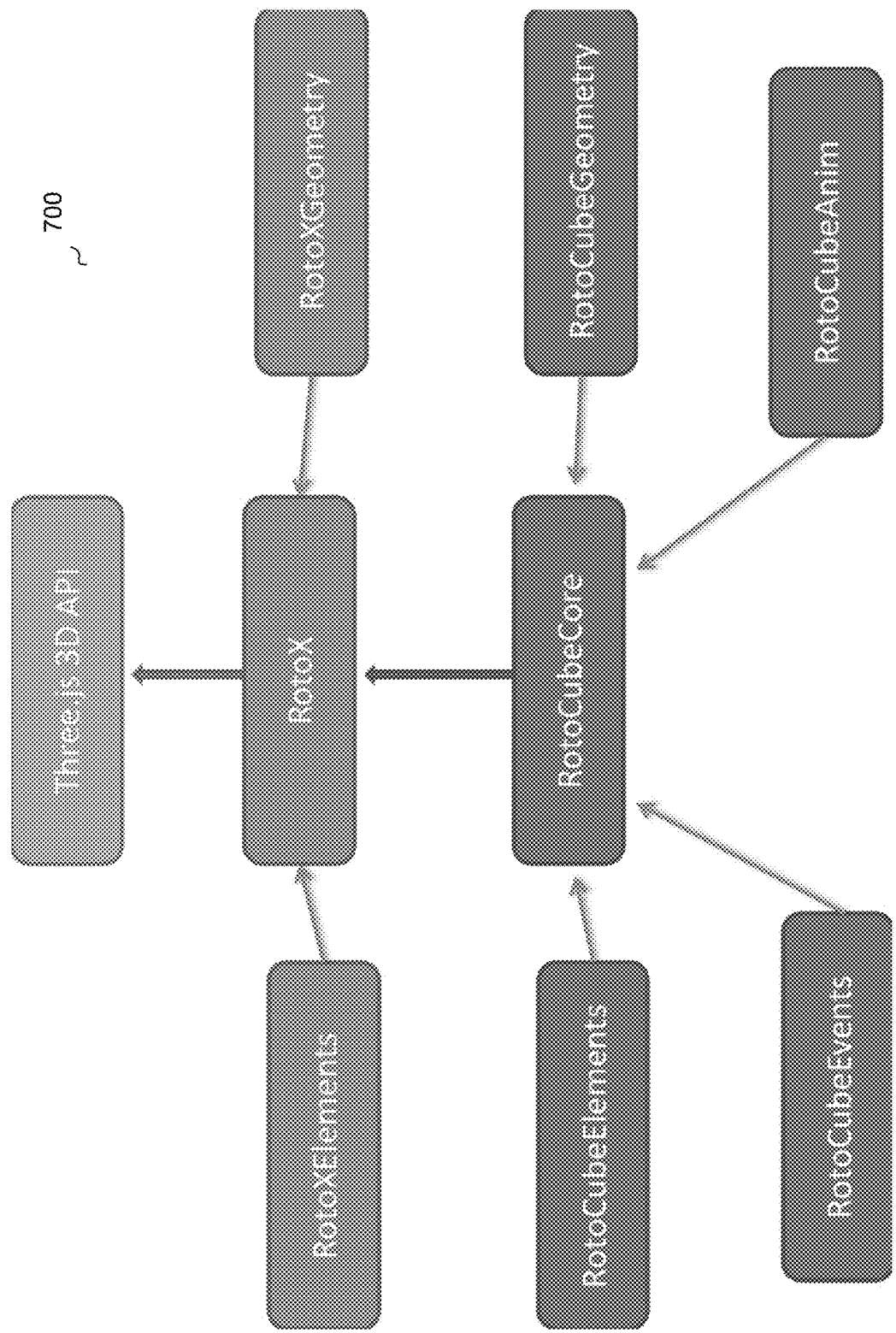
FIG. 7 illustrates an example software programming structure for generating and dynamically displaying a three-dimensional graphical user according to an example embodiment.

FIG. 7 illustrates an example software programming interface for generating and dynamically displaying a three-dimensional graphical user according to an example embodiment. For example, the three-dimensional interface described in this disclosure can be implemented by extending a software programming interface, such as an application programming interface ("API"). In an embodiment, the "Three.js" JavaScript 3D API can be extended by one or more software structures. Various embodiments can implement WebGL, CSS3D, or other suitable technologies. While descriptions have been provided for web applications, embodiments can use three-dimensional APIs for other applications and implement one or more of Visual C++.Net, Visual C#.Net, DirectX, OpenGL, or any other suitable APIs or technologies.

The "RotoX" descriptors in FIG. 7 indicate software structure that implements the three-dimensional interface in any suitable shape, and the "RotoCube" descriptors indicate software structure that implements the three-dimensional interface in a cube shape. Any other suitable programming language, programming interface, API, software executables, or software logic can be used to implement the three-dimensional interfaces without deviating from the scope of the disclosure. The software functionality for generating and displaying the data visualizations may be packaged into an application development framework ("ADF"). In various embodiments, any suitable browser that supports WebGL (or similar technology) and javaScript (or similar programming language) can be used to display the interfaces of this disclosure. The data sets used to generate the various interfaces can be loaded by any suitable manner, including from sources such as JavaScript Object Notation (JSON) objects, web services, databases, and the like.

Figure 8:
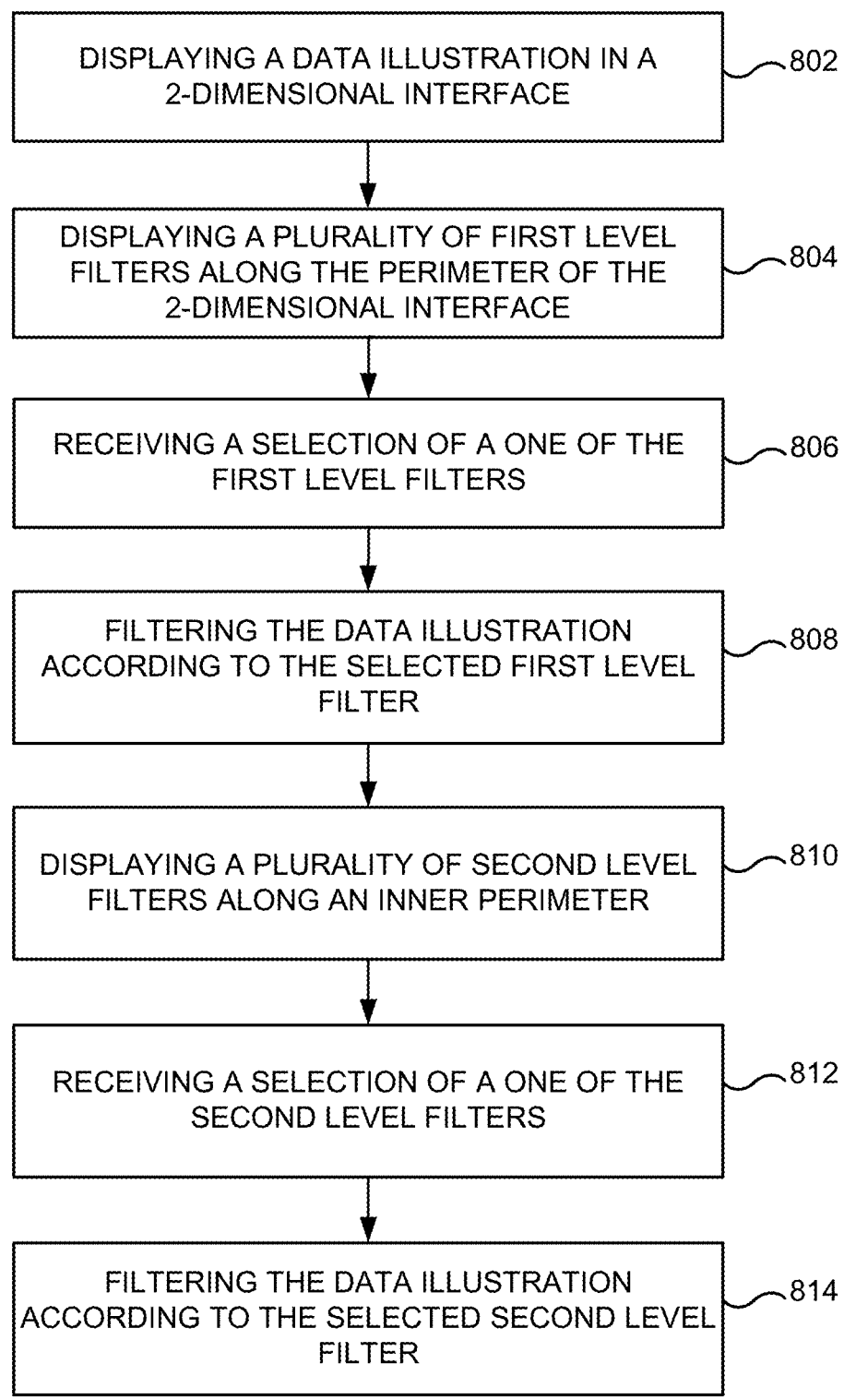
FIG. 8 illustrates a flow diagram for dynamically filtering a data illustration on a graphical user interface according to an example embodiment.
Figure 9:
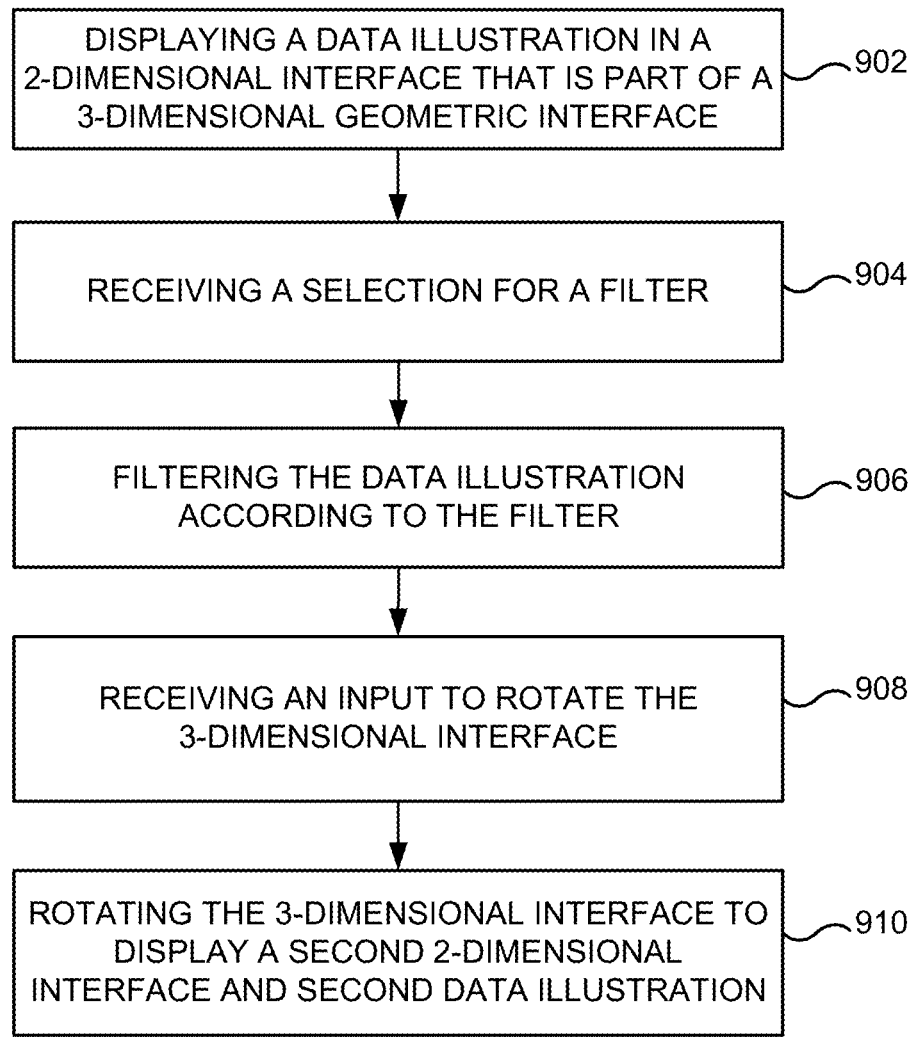
FIG. 9 illustrates a flow diagram for dynamically displaying facets of data on a three-dimensional graphical user interface according to an example embodiment.

FIG. 8 illustrates a flow diagram 800 for dynamically filtering a data illustration on a graphical user interface according to an example embodiment. In one embodiment, the functionality of the flow diagram 800 of FIG. 8 and flow diagram 900 of FIG. 9 are implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software. In embodiments, the functionality of flow diagram 800 is performed at a wireless device by hardware, software, or a combination of these.

At 802, a first data illustration is displayed in a two-dimensional interface. For example, referring back to FIGS. 2A-2D, two-dimensional interface 202A can be displayed along with data illustration 204A. At 804, interface 204A displays a plurality of first level filters 206 for the data illustration 204A. For example, first level filters 206 can be displayed along a perimeter of interface 202A. In an embodiment, the data depicted in data illustration 204A can include a data facet of a data set. In some examples, the data set can be a hierarchical data set. In an embodiment that implements a hierarchical data set, first level filters 206 can be nodes, such as parent nodes for the data set.

At 806, a selection of one of first level filters 206 is received. For example, a selection for the "Honda" first level filter 206 can be received. At 808, data illustration 204 can be filtered according to the selected filter. For example, data illustration 204A can be filtered according to the selected first level filter 206 to dynamically display data illustration 204D. In some embodiments, filtering data illustration 204A can include drilling-down a hierarchical data set based on the selected first level filter 206 to dynamically display data illustration 204D.

At 810, a plurality of second level filters 212 can be displayed on interface 202. For example, second level filters 212 can be displayed upon filtration and display of data illustration 204D based on the selected one of first level filters 206. In some embodiments, second level filters 212 can be child nodes of a selected parent node. For example, the selected first level filter 206 can be a parent node and second level filters 212 can be the child nodes for the parent. In some embodiments, a transition animation or motion can be used to display second level filters 212.

At 812, a selection for one of second level filters 212 can be received from a user. At 814, data illustration 204D can be filtered according to the selected second level filter 212. In an example, an updated data illustration can be dynamically displayed (not depicted in FIGS. 2A-2D). In some embodiments, third level filters can be dynamically displayed upon receiving a selection for one of second level filters 212. In an implementation that uses a hierarchical data set, the third level filters can be grandchild nodes of the selected parent node and child node. For example, selected first level filter 206 can be a parent node and selected second level filter 212 can be a child node. Third level filters can be grandchildren based on a hierarchical drill-down using the selected parent and child nodes.

FIG. 9 illustrates a flow diagram 900 for dynamically displaying facets of data on a three-dimensional graphical user interface according to an example embodiment. At 902, a first data illustration of a first facet of data is displayed in a first two-dimensional interface, wherein the first two-dimensional interface corresponds to a side or cross-section of a three-dimensional interface. For example, referring back to FIGS. 5A-5D, three-dimensional interface 502 can be displayed where two-dimensional interface 504 can be one side or cross-section of three-dimensional interface 502. In some embodiments, interface 504 can be displayed along with first level filters 508A, the filters being displayed along a perimeter of the interface.

At 904, similar to 806 of FIG. 8, a selection of one of the plurality of filters can be received form a user. At 906, data illustration 506A can be filtered according to the selected one of first level filters 508A.

At 908, an input can be received at rotation point 510 to rotate interface 502. At 910, three-dimensional interface 502 can be dynamically rotated from displaying two-dimensional interface 504 to displaying two-dimensional interface 514, which corresponds to a second side or cross-section of interface 502. Interface 514 can correspond to a second facet of data and data illustration 506D can depict the second facet of data. In some implementations, a rotation animation can be triggered when rotating from interface 504 to interface 514.

In some embodiments, the plurality of filters displayed on interface 504 can be similarly displayed on interface 514, where data illustration 506D is filtered according to similar or the same filters as data illustration 506A. For example, filters selected on interface 504 may be used to filter the second facet of data displayed on interface 514 when interface 502 if rotated. In some embodiments, the filters selected on interface 504 may correspond to a drill-down level of a data hierarchy, and interface 514 can display the second facet of data at the same drill-down level after rotation.

In some embodiments, the described three-dimensional interface can be implemented using a physical display, such as a rotatable three-dimensional shape (e.g., a display that includes a physical cube). The rotatable display can include a display screen on each side (e.g., six display screens) and can include a touch sensitive surface. Thus, the display can be rotated to show different facets of data and filtered or drilled-down using touch selection of filters. For example, the display can include hardware, such as a processor, for generating and displaying the dynamic content. In one embodiment, a physical button can correspond to a rotation point, where the physical button triggers a mechanical motor that rotates the display to show a different side. In other embodiments, the rotation point can be a soft button (e.g., on the displayed interface) that triggers the rotation. The display can include a controller that instructs the motor to rotate to the side of the three-dimensional display that corresponds to the selected rotation point.

While a car sales data set is described, any other data set or hierarchical data set can be implemented, displayed, and navigated on the three-dimensional interface. For example, stock information can be displayed on different sides or cross-sections of the interface, where the different facets of data can include stock price trends or history, company performance data such as profits and losses, stock analytics such as price per earnings, and any other suitable facet data.

Embodiments provide a graphical user interface for displaying dynamic content. For example, a graphical user interface can include a three-dimensional interface that can be rotated to display different facets of data. The three-dimensional interface can include sides or cross-sections that are two-dimensional interfaces, where each side or cross-section includes a data illustration depicting a different facet of data. Filtration or dill-down functionality can also be implemented, where filtration or drill-down on one side or cross-section of the three-dimensional interface also filters other sides or cross-sections. Example three-dimensional interfaces include cubes, prisms, rectangular prisms, other suitable polyhedron, spheres, cylinders, other suitable three-dimensional geometric shapes, or other suitable three-dimensional shapes. Example two-dimensional interfaces include squares, rectangles, pentagons, other suitable polygons, other geometric interfaces, or any other suitable two-dimensional shapes.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

We claim:

1. A method for displaying dynamic content on a graphical user interface, the method comprising:
    displaying a first data illustration of a first facet of a data set in a first two-dimensional interface, wherein the first two-dimensional interface corresponds to a side or cross-section of a three-dimensional interface, and the first two-dimensional interface displays a plurality of filters for the first data illustration and a data quality for each filter, the data quality indicating a data attribute for the first facet of the data set when filtered by the corresponding filter;
    receiving, from a user, a selection for one of the plurality of filters;
    receiving, from the user, a selection to display a second facet of the data set; and
    displaying a dynamic rotation of the three-dimensional interface to a second side or cross-section that corresponds to a second two-dimensional interface, wherein a second data illustration of the second facet of the data set is displayed in the second interface, the second data illustration being filtered according to the selected filter.

2. The method of claim 1, further comprising:
    dynamically altering the displayed first two-dimensional interface in response to the selected filter, wherein the data illustration is filtered according to the selected filter.

3. The method of claim 1, wherein the data set comprises a hierarchical data set, the plurality of filters represent one or more nodes of the hierarchical data set, and the data attribute indicated by the displayed data quality for each filter is based on the hierarchical data set when filtered by the corresponding filter.

4. The method of claim 3, wherein the first facet of the data set and second facet of the data set are organized according to a same hierarchy such that the selected filter is applicable to the first facet of the data set and the second facet of the data set.

5. The method of claim 3, wherein the data attribute indicated by the displayed data quality for each filter indicates a depth of the hierarchical data set based on traversal using the corresponding filter.

6. The method of claim 1, wherein the three-dimensional geometric interface is a cube and the first and second two-dimensional interfaces are squares.

7. The method of claim 6, wherein each side of the cube corresponds to a different facet of the data set.

8. The method of claim 1, wherein the plurality of filters comprise first level filters that are displayed along a perimeter of the two-dimensional interface.

9. The method of claim 8, further comprising, in response to receiving the selection for one of the plurality of first level filters, displaying a plurality of second level filters for the first facet of the data set across an inner perimeter of the first two-dimensional geometric interface located between the perimeter of first level filters and the first data illustration.

10. The method of claim 9, wherein, after dynamic rotation of the three-dimensional interface, the plurality of second level filters are displayed for the second data illustration.

11. A computer-readable medium having instructions stored thereon that, when executed by a processor, cause the processor to display dynamic content on a graphical user interface, the display comprising:

displaying a first data illustration of a first facet of a data set in a first two-dimensional interface, wherein the first two-dimensional interface corresponds to a side or cross-section of a three-dimensional interface, and the first two-dimensional interface displays a plurality of filters for the first data illustration and a data quality for each filter, the data quality indicating a data attribute for the first facet of the data set when filtered by the corresponding filter;

receiving, from a user, a selection for one of the plurality of filters;

receiving, from the user, a selection to display a second facet of the data set; and displaying a dynamic rotation of the three-dimensional interface to a second side or cross-section that corresponds to a second two-dimensional interface, wherein a second data illustration of the second facet of the data set is displayed in the second interface, the second data illustration being filtered according to the selected filter.

12. The computer-readable medium of claim 11, wherein the data set comprises a hierarchical data set and the plurality of filters represent one or more nodes of the hierarchical data set, and the data attribute indicated by the displayed data quality for each filter is based on the hierarchical data set when filtered by the corresponding filter.

13. The computer-readable medium of claim 11, wherein the three-dimensional geometric interface is a cube and the first and second two-dimensional interfaces are squares.

14. The computer-readable medium of claim 13, wherein each side of the cube corresponds to a different facet of the data set.

15. The computer-readable medium of claim 11, wherein the plurality of filters comprise first level filters that are displayed along a perimeter of the two-dimensional interface.

16. The computer-readable medium of claim 15, wherein the displaying further comprises, in response to receiving the selection for one of the plurality of first level filters, displaying a plurality of second level filters for the first facet of data across an inner perimeter of the first two-dimensional geometric interface located between the perimeter of first level filters and the first data illustration.

17. The computer-readable medium of claim 16, wherein, after dynamic rotation of the three-dimensional interface, the plurality of second level filters are displayed for the second data illustration.

18. A system for displaying dynamic content on a graphical user interface, the system comprising:

a processor in communication a non-transitory memory storing instructions, wherein, when executing the instruction, the processor is configured to:

display a first data illustration of a first facet of a data set in a first two-dimensional interface, wherein the first two-dimensional interface corresponds to a side or cross-section of a three-dimensional interface, and the first two-dimensional interface displays a plurality of filters for the first data illustration and a data quality for each filter, the data quality indicating a data attribute for the first facet of the data set when filtered by the corresponding filter;

receive, from a user, a selection for one of the plurality of filters;

receive, from the user, a selection to display a second facet of the data set; and display a dynamic rotation of the three-dimensional interface to a second side or cross-section that corresponds to a second two-dimensional interface, wherein a second data illustration of the second facet of the data set is displayed in the second interface, the second data illustration being filtered according to the selected filter.

19. The system of claim 18, wherein the processor is further configured to:

dynamically alter the displayed first two-dimensional interface in response to the selected filter, wherein the data illustration is filtered according to the selected filter.

20. The system of claim 18, wherein the data set comprises a hierarchical data set and the plurality of filters represent one or more nodes of the hierarchical data set and a data quality for each filter, the data quality indicating a data attribute for the first facet of the data set when filtered by the corresponding filter.

* * * * *